(12) United States Patent
Kim et al.

(10) Patent No.: US 9,817,176 B2
(45) Date of Patent: Nov. 14, 2017

(54) DISPLAY DEVICE INCLUDING OPTICAL MEMBER HAVING OPTICAL PATTERNS

(71) Applicant: Samsung Display Co., Ltd., Yongin-Si, Gyeonggi-Do (KR)

(72) Inventors: Joonghyun Kim, Asan-si (KR); Juyoun Son, Hwaseong-si (KR); Kang-Woo Lee, Seoul (KR); Seunghwan Chung, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 143 days.

(21) Appl. No.: 14/979,811

(22) Filed: Dec. 28, 2015

(65) Prior Publication Data

US 2016/0187564 A1   Jun. 30, 2016

(30) Foreign Application Priority Data

Dec. 29, 2014  (KR) .................. 10-2014-0192108

(51) Int. Cl.
*F21V 8/00* (2006.01)

(52) U.S. Cl.
CPC ......... *G02B 6/0051* (2013.01); *G02B 6/0046* (2013.01); *G02B 6/0053* (2013.01); *G02B 6/0086* (2013.01); *G02B 6/0068* (2013.01)

(58) Field of Classification Search
CPC .................................................. G02B 6/0035
USPC ............... 362/606, 607, 609, 618, 627, 620
See application file for complete search history.

(56) References Cited

U.S. PATENT DOCUMENTS

| 8,926,157 | B2 | 1/2015 | Umeda et al. | |
| 2009/0185394 | A1* | 7/2009 | Takahashi | G02B 6/0068 362/613 |
| 2010/0245717 | A1* | 9/2010 | Miyamoto | G02B 6/0051 349/65 |
| 2013/0329401 | A1 | 12/2013 | Yamamoto et al. | |
| 2013/0335821 | A1* | 12/2013 | Robinson | G02B 6/0023 359/464 |
| 2014/0111862 | A1 | 4/2014 | Yamamoto et al. | |
| 2014/0133177 | A1* | 5/2014 | Miller | G02B 6/005 362/607 |

(Continued)

FOREIGN PATENT DOCUMENTS

| KR | 10-0898047 B1 | 5/2009 |
| KR | 1020110064285 A | 6/2011 |

(Continued)

*Primary Examiner* — Allyson Trail
(74) *Attorney, Agent, or Firm* — Cantor Colburn LLP

(57) ABSTRACT

A display device includes a backlight assembly and a display panel which displays an image. The backlight assembly includes a light emitting unit which generates light, and an optical member which adjusts a path of the light incident thereto and outputs the light toward the display panel. The optical member includes a first base film to which the light is incident, a second base film closer to the display panel than the first base film and for which are defined first and second areas alternately disposed, a first optical pattern between the first and second base films at the first area, where the first optical pattern refracts therein the light incident to the first base film, and a second optical pattern between the first and second base films at the second area, where the second optical pattern scatters the light incident to the first base film.

16 Claims, 8 Drawing Sheets

(56) References Cited

U.S. PATENT DOCUMENTS

| | | | | |
|---|---|---|---|---|
| 2016/0147004 A1* | 5/2016 | Lee | ................ | G02B 6/0053 |
| | | | | 362/23.03 |
| 2016/0202513 A1* | 7/2016 | Kang | ................ | G02F 1/1336 |
| | | | | 345/690 |
| 2016/0363708 A1* | 12/2016 | You | ................ | G02B 6/0055 |
| 2017/0115440 A1* | 4/2017 | Zhu | ................ | G02B 6/005 |

FOREIGN PATENT DOCUMENTS

| | | |
|---|---|---|
| KR | 1020130015948 A | 2/2013 |
| KR | 1020130074505 A | 7/2013 |
| KR | 10-1336039 B1 | 11/2013 |

\* cited by examiner

DISPLAY DEVICE INCLUDING OPTICAL MEMBER HAVING OPTICAL PATTERNS

This application claims priority to Korean Patent Application No. 10-2014-0192108, filed on Dec. 29, 2014, and all the benefits accruing therefrom under 35 U.S.C. §119, the entire contents of which are hereby incorporated by reference.

BACKGROUND (1) Field

The disclosure herein relates to a display device, and more particularly, relates to a display device which displays images by using light output from a backlight assembly.

(2) Description of the Related Art

Display devices such as liquid crystal displays include a backlight assembly which generates and outputs light, and a display panel which displays images by using the light output from the backlight assembly. The backlight assembly may include a light emitting unit which generates the light, a light guide plate which guides the light generated from the light emitting unit toward the display panel, and an optical member which controls a path of the guided light from the light guide plate.

A diffuser plate and a prism plate are examples of the optical member. The diffuser plate diffuses the light emitted from the light guide plate, and accordingly, the brightness of the display device can be made substantially uniform by the diffuser plate. Also, the prism plate refracts obliquely-incident light to the prism plate such that a path of the obliquely-incident light becomes closer to a direction perpendicular to the prism plate, and accordingly, the brightness in a front surface direction of the display device may be enhanced by the prism plate.

SUMMARY

One or more exemplary embodiment of the invention provides a display device having enhanced displaying quality.

One or more exemplary embodiment of the invention provides a display device including a backlight assembly which generates a light, and a display panel which displays an image with the light generated by the backlight assembly. The backlight assembly includes a light emitting unit which generates the light, and an optical member to which the light generated by the light emitting unit is incident, where the optical member adjusts a path of the light incident thereto, the light for which the path thereof is adjusted is output from the optical member toward the display panel.

In one or more exemplary embodiment, the optical member includes a first base film to which the light generated by the light emitting unit is incident, a second base film for which are defined a first area and a second area alternately disposed, the second base film facing the first base film to be disposed closer to the display panel than the first base film, a first optical pattern between the first and second base films at the first area of the second base film, where the first optical pattern refracts therein the light incident to the first base film, and a second optical pattern between the first and second base films at the second area of the second base film, where the second optical pattern scatters the light incident to the first base film.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
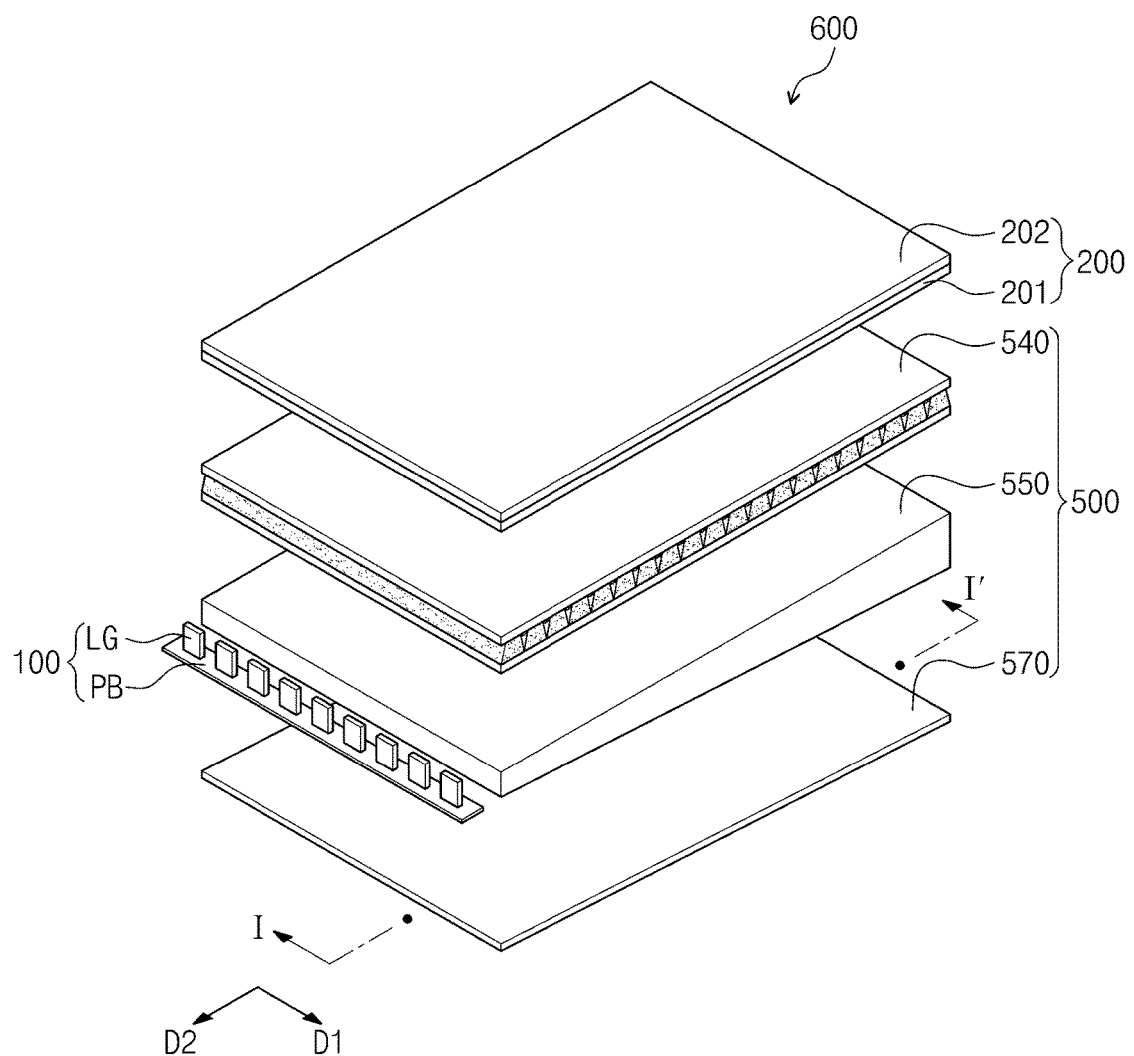
FIG. 1 is an exploded perspective view illustrating an exemplary embodiment of a display device according to the invention.

Exemplary embodiments of the invention will be described below in more detail with reference to the accompanying drawings. The objects, other objectives, features, and advantages of the invention will be understood without difficulties through exemplary embodiments described below as related to the accompanying drawings. The invention may, however, be embodied in different forms and should not be construed as limited to the exemplary embodiments set forth herein. Rather, exemplary embodiments described below are provided so that this disclosure will be thorough and complete, and will fully convey the scope of the invention to those skilled in the art. Accordingly, the scope of the invention should not be construed as limited to the exemplary embodiments set forth herein. Also in the exemplary embodiments described below and the drawings, like reference numerals refer to like elements throughout.

Also, in the following description, terms, such as "first" and "second," are not used for limitation but for distinguishing one component from another component. Also, it will be understood that when a film, a region, a component, etc. is referred to as being 'on' another layer, region, or plate, it can be directly on the other layer, region, or plate, or intervening layers, regions, or plates may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
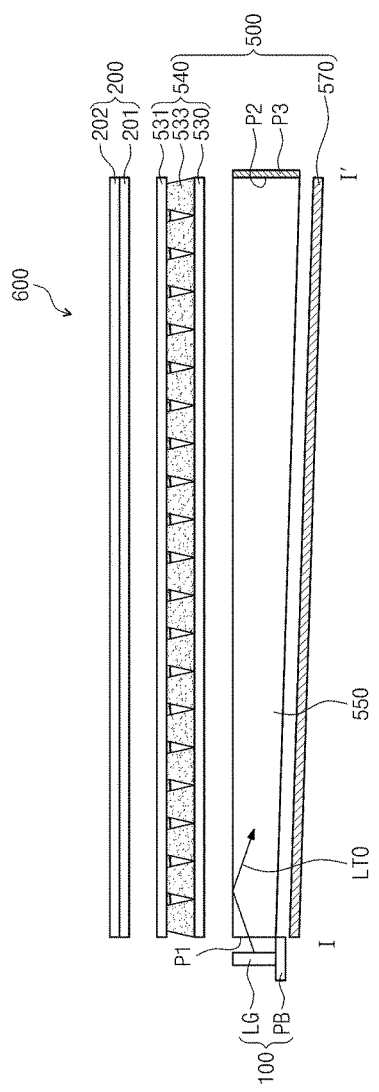
FIG. 2 is a cross-sectional view of the display device of FIG. 1 taken along line I-I' of FIG. 1.

FIG. 1 is an exploded cross-sectional view illustrating an exemplary embodiment of a display device according to the invention, and FIG. 2 is a cross-sectional view of the display device of FIG. 1 taken along line I-I' of FIG. 1.

Referring to FIGS. 1 and 2, the display device 600 includes a display panel 200 and a backlight assembly 500.

The display panel 200 displays images using light output from the backlight assembly 500. The display panel 200 may include a display substrate 201, a facing substrate 202, and a liquid crystal layer (not shown) interposed between the display substrate 201 and the facing substrate 202.

The display substrate 201 may include multiple pixel electrodes (not shown), which are respectively disposed on multiple pixel regions, and the facing substrate 202 may include a common electrode (not shown) facing the multiple pixel electrodes. However, the invention is not limited to the above-mentioned structure of the display panel 200. In another exemplary embodiment, for instance, the facing substrate 202 does not include the common electrode, and the display substrate 201 may include the common electrode as well as the multiple pixel electrodes therein.

The backlight assembly 500 includes a light emitting unit 100, a reflecting member 570, a light guide plate 550 and an optical member 540. A space may be defined between the light guide plate 550 and the optical member 540.

The light emitting unit 100 generates a source light LT0, and is disposed to be adjacent to a side surface of the light guide plate 550. Accordingly, the source light LT0 generated by the light emitting unit 100 is emitted from the light emitting unit 100 into the light guide plate 550 through the side surface of the light guide plate 550.

The light emitting unit 100 may include a printed circuit board PB and a plurality of light emitting diode packages LG. The multiple light emitting diode packages LG are mounted on the printed circuit board PB, and are arranged in a first direction D1 along the side surface of the light guide plate 550.

The multiple light emitting diode packages LG are arranged along the side surface of the light guide plate 550, but the invention is not limited in terms of the positions and the number of the light emitting diode packages LG. In another exemplary embodiment, for instance, a light emitting unit other than the light emitting unit 100 described herein may be disposed to be adjacent to the side surface of the light guide plate 550 or a light emitting unit may be disposed adjacent to multiple side surfaces of the light guide plate 550.

The reflecting member 570 has a light reflecting property, and is disposed to be adjacent to a bottom surface of the light guide plate 550. The reflecting member 570 reflects the light output from the light guide plate 550 through the bottom surface thereof, and the light reflected by the light reflecting member 570 may be incident toward the light guide plate 550.

The reflecting member 570 may have a sheet shape with a cross-section thickness of about several micrometers to about several hundred micrometers. The reflecting member 570 may be an element which is separate from the light guide plate 550. In another exemplary embodiment, the reflecting member 570 may include a coating on the bottom surface of the light guide plate 550, such as a coating including a reflective material.

The light guide plate 550 is disposed on the reflecting member 570. The light guide plate 550 includes a light incident portion P1, a light facing portion P2 and a light reflecting portion P3. The source light LT0 is incident into the light guide plate 550 through the light incident portion P1. The incident source light LT0 proceeds toward the light facing portion P2, and the source light LT0 arriving at the light facing portion P2 may be reflected at the light reflecting portion P3.

In the illustrated exemplary embodiment, the light guide plate 550 may be a wedge-type panel in a cross-sectional view. Accordingly, a cross-sectional thickness of the light guide plate 550 becomes smaller in a direction toward the light incident portion P1, and becomes greater in a direction toward the light facing portion P2.

When the source light LT0 is reflected at the light reflecting portion P3 of the light guide plate 550 and then proceeds within the light guide plate 550 toward the light incident portion P1, a reflection angle of the source light LT0 within the light guide plate 550 varies because the thickness of the light guide plate 550 varies. As such, when the reflection angle of the source light LT0 within the light guide plate 550 becomes smaller than a critical angle which generates a total reflection, the source light LT0 may be output from the light guide plate 550 through a light emitting surface thereof. Referring to FIGS. 1 and 2, the light emitting surface of the light guide plate 550 faces a bottom surface of the optical member 540.

Figure 3A:
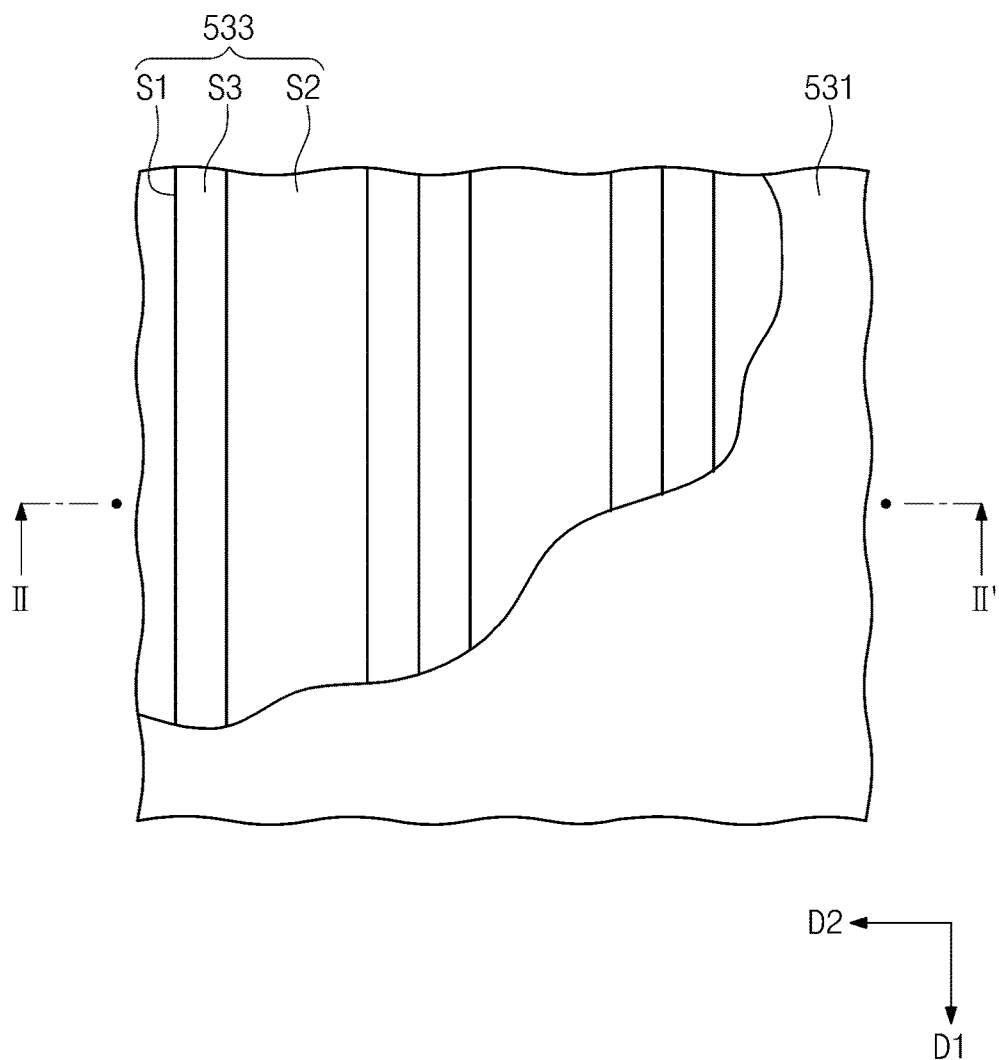
FIG. 3A is a plan view illustrating a portion of an exemplary embodiment of the optical member in the display device illustrated in FIG. 2.
Figure 3B:
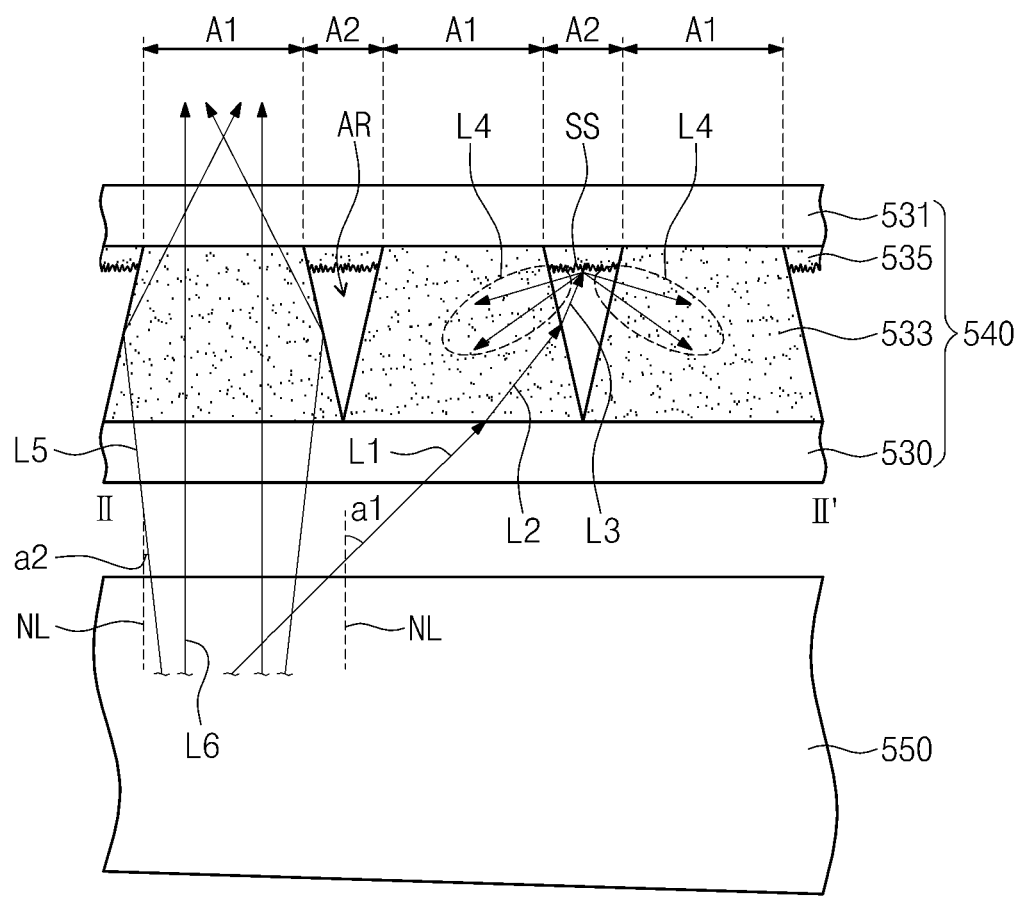
FIG. 3B is a cross-sectional view of a portion of the display device taken along line II-II' of FIG. 3A.

The optical member 540 is disposed between the light guide plate 550 and the display panel 200, and a path of light passing between the light guide plate 550 and the display panel 200 is adjusted by the optical member 540. Referring to FIGS. 3A and 3B, the structure and the function of the optical member 540 will be specifically described as follows.

FIG. 3A is a plan view illustrating a portion of an exemplary embodiment of the optical member in the display device illustrated in FIG. 2, and FIG. 3B is a cross-sectional view of a portion of the display device taken along line II-II' of FIG. 3A.

Referring to FIGS. 3A and 3B, the optical member 540 includes a first base film 530, a second base film 531, multiple first optical patterns 533 and multiple second optical patterns 535. The first and second optical patterns 533 and 535 may otherwise be referred to as first and second optical patterns.

The first and second base films 530 and 531 may be light-transmitting films. In an exemplary embodiment, for example, the first or second base films 530 or 531 may be films including a polymer material, such as polyethylene terephthalate ("PET"), polymethyl methacrylate ("PMMA") and polycarbonate ("PC").

The second base film 531 faces the first base film 530, and is closer to the display panel 520 than the first base film 530. Also, a first area A1, and a second area A2 which is alternately located with the first area A1, are defined in the second base film 531.

The multiple first optical patterns 533 are disposed between the first and second base films 530 and 531 and are coupled to both the first and second base films 530 and 531. As illustrated in FIG. 3B, the multiple first areas A1 may be defined in the second base film 531, and the multiple first optical patterns 533 may be in one-to-one correspondence with the multiple first areas A1.

In the illustrated exemplary embodiment, the multiple first optical patterns 533 may respectively have lengths extended in the first direction D1, may respectively have widths smaller than the lengths in a second direction D2 perpendicular to the first direction D1, and may be arranged in the second direction D2. The lengths of the first optical patterns 533 may be continuously elongated in the first direction D1.

The multiple second optical patterns 535 are disposed between the first and second base films 530 and 531, and are respectively disposed corresponding to the second areas A2 of the second base film 531. As illustrated in FIG. 3B, the second areas A2 may be defined in plurality in the second base film 531, and the multiple second optical patterns 535 may be in one-to-one correspondence with the multiple second areas A2. The first and second optical patterns 533 and 535 alternate in the second direction D2.

The multiple second optical patterns 535 may respectively have lengths extended in the first direction D1, may respectively have widths extended in the second direction D2 and may be arranged in the second direction D2. The lengths of the second optical patterns 535 may be continuously elongated in the first direction D1.

The structures of a first optical pattern 533 from among the multiple first optical patterns 533 and a second optical pattern 535 from among the multiple second optical patterns 535 will be described below as an example.

In the illustrated exemplary embodiment, the first optical pattern 533 may have a taper-shaped cross-section. More specifically, the first optical pattern 533 has a lower surface S1, an upper surface S2, and a side surface S3 connecting the lower surface S1 to the upper surface S2. The side surface S3 may be inclined with respect to each of the lower surface S1 and the upper surface S2 in the cross-sectional view. Also, a size of the lower surface S1 in the second direction D2 may be greater than that of the upper surface S2. In the plan view, the upper surface S2 may be located inside the lower surface S1.

As described above, since the first optical pattern 533 has a tapered shape, a space may be defined between adjacent first optical patterns 533. A material may be disposed in the space defined between the adjacent first optical patterns 533. In an exemplary embodiment, material in the form of an air layer AR may be defined in the space between the adjacent first optical patterns 533.

In the illustrated exemplary embodiment, the first optical pattern 533 may include a polymer material having a light-transmitting property. Also, the refractive index of the first optical pattern 533 may be greater than that of the air layer AR, and may be equal to or greater than that of the first base film 530.

The second optical pattern 535 is located in the second area A2 of the second base film 531. The second optical pattern 535 is disposed in the space defined between the adjacent first optical patterns 533. The second optical pattern 535 is spaced apart from the first base film 530 with the air layer AR interposed therebetween. Also, in the space defined between the adjacent first optical patterns 533, the second optical pattern 535 contacts the air layer AR. In an exemplary embodiment, the second optical pattern 535 may include defined therefor a concavo-convex surface SS, and the concavo-convex surface SS of the second optical pattern 535 may contact the air layer AR. Since the second optical pattern 535 occupies a portion of the space defined between the adjacent first optical patterns 533, the concavo-convex surface SS faces a remaining portion of the space not occupied by the second optical pattern 535.

In the illustrated exemplary embodiment, the second optical pattern 535 may include a polymer material. Also, the refractive index of the second optical pattern 535 may be greater than that of the air layer AR, and may be equal to that of the second base film 531.

An optical function of the first and second optical patterns 533 and 535 will be described with reference to FIGS. 2 and 3B as follows.

The source light LT0 initially generated by the light emitting unit 100 and reflected within the light guide plate 550 (FIG. 2) is output from the light guide plate 550 to be incident toward the optical member 540. The light output from the light guide plate 550 is incident on the first base film 530 of the optical member 540. The first optical pattern 533 refracts light transmitted through the first base film 530. More specifically, first light L1 of the source light LT0 is output from the light guide plate 550, and is then incident to the first base film 530. Then, the first optical pattern 533 refracts the first light L1, and as a result, the first light L1 is refracted, so that second light L2 may be defined within the optical member 540.

Also, the second light L2 defined by refraction of the first light L1 by the first optical pattern 533 is refracted at an interface between the first optical pattern 533 and the air layer AR, and as a result, the second light L2 is refracted and third light L3 may be defined within the optical member 540. After that, the third light L3 defined by refraction of the second light L2 at the interface between the first optical pattern 533 and the air layer AR may arrive at the second optical pattern 535. The third light L3 arriving at the second optical pattern 535 is scattered by the concavo-convex surface SS of the second optical pattern 535. As a result, the third light L3 is scattered so that fourth light L4 may be defined within the optical member 540.

In the illustrated exemplary embodiment, the concavo-convex shape of the concavo-convex surface SS may be random across the second optical pattern 535 in the first and/or second directions D1 and D2. Accordingly, the third light L3 defined by the refraction of the second light L2 at the interface between the first optical pattern 533 and the air layer AR may be refracted multiple times at the concavo-convex surface SS, such that the traveling direction of the fourth light L4 defined by scattering of the third light L3 at the concavo-convex surface SS may be random. Referring to the multiple traveling paths of the fourth light L4 illustrated in FIG. 3B, light components traveling toward the first base film 530 from among the multiple light components of the fourth light L4 may be increased, so as to decrease the probability of the fourth light L4 being transmitted through the first base film 530.

With reference to a normal line NL of the first and second base films 530 and 531, the source light LT0 is output from the light guide plate 550 to be incident into the first base film 530 at different incidence angles. Referring to FIG. 3B, the first light L1 from among the source light LT0 output from the light guide plate 550 is incident into the first base film 530 at a first incidence angle a1, and a fifth light L5 from among the source light LT0 output from the light guide plate 550 is incident into the first base film 530 at a second incidence angle a2 smaller than the first incidence angle a1. The first and fifth lights L1 and L5 are incident to the first optical pattern 530 at the first incidence angle a1 and the second incidence angle a2, respectively.

In the illustrated exemplary embodiment, the refractive index of the first optical pattern 533 is greater than that of the air layer AR. Accordingly, when the second incidence angle a2 is greater than a critical angle generating a total reflection in the first optical pattern 533, the fifth light L5 may be emitted through the second base film 531 to outside the optical member 540 after being totally reflected in the first optical pattern 533.

In the illustrated exemplary embodiment, the refractive index of the first optical pattern 533 may be equal to that of the second base film 531. Accordingly, when the fifth light L5 totally reflected in the first optical pattern 533 is transmitted through an interface between the first optical pattern 533 and the second base film 531, the fifth light L5 may be easily output outside the optical member 540 without being refracted thereby.

Also, a sixth light L6 from among the source light LT0 output from the light guide plate 550, traveling in a direction substantially parallel to the normal line NL of the first and second base films 530 and 531, is sequentially transmitted through the first base film 530, the first optical pattern 533 and the second base film 531 without refraction, reflection or scattering within the optical member 540, and may then be output outside the optical member 540. Since the refractive index of the first optical pattern 533 may be equal to that of the second base film 531, when the sixth light L6 is transmitted through the interface of the first optical pattern 533 and the second base film 531, the sixth light L6 may be easily output outside the optical member 540 without being refracted thereby.

Referring to the above-mentioned paths of the first light L1, the fifth light L5 and the sixth light L6, light components among the source light LT0 traveling along the path of the first light L1 are not easily emitted outside the optical member 540. However, light components among the source light LT0 traveling along the paths of the fifth and sixth lights L5 and L6 may be easily output outside the optical member 540. That is, according to the size of the first and second incidence angles a1 and a2, traveling paths of the first, fifth and sixth lights L1, L5 and L6 may defined within the optical member 540.

Accordingly, lights traveling in paths along directions closer (e.g., more parallel) to the normal lines NL than the first light L1, such as the fifth and sixth lights L5 and L6, may be supplied to the display panel 200 by the optical member 540, such that the brightness in a front surface direction of the display panel 200 may be enhanced. Also, the optical member 540 may block the light, such as the first light L1, which is supplied toward the display panel 200 in an inclined direction to the front surface direction (e.g., along a direction further (e.g., less parallel) to the normal lines NL), such that a deterioration of contrast in the front surface direction of the display panel 200 may be reduced or effectively prevented.

Figure 4A:
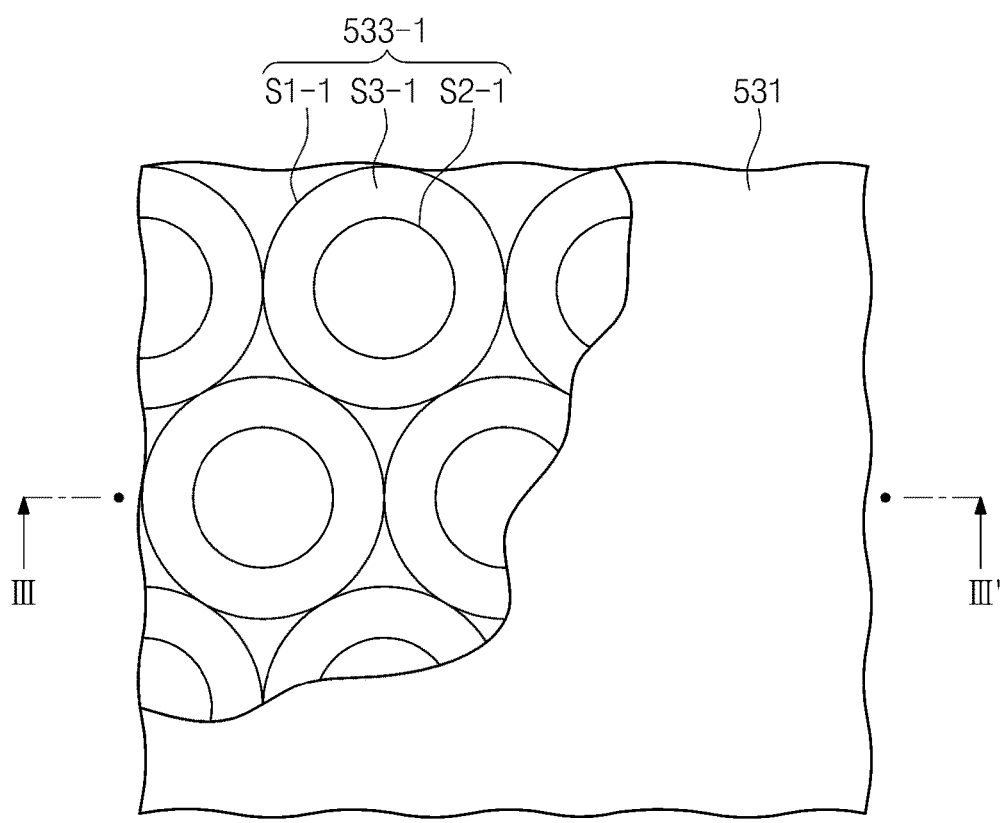
FIG. 4A is a plan view illustrating a portion of another exemplary embodiment of an optical member in the display device illustrated in FIG. 2 according to the invention.
Figure 4B:
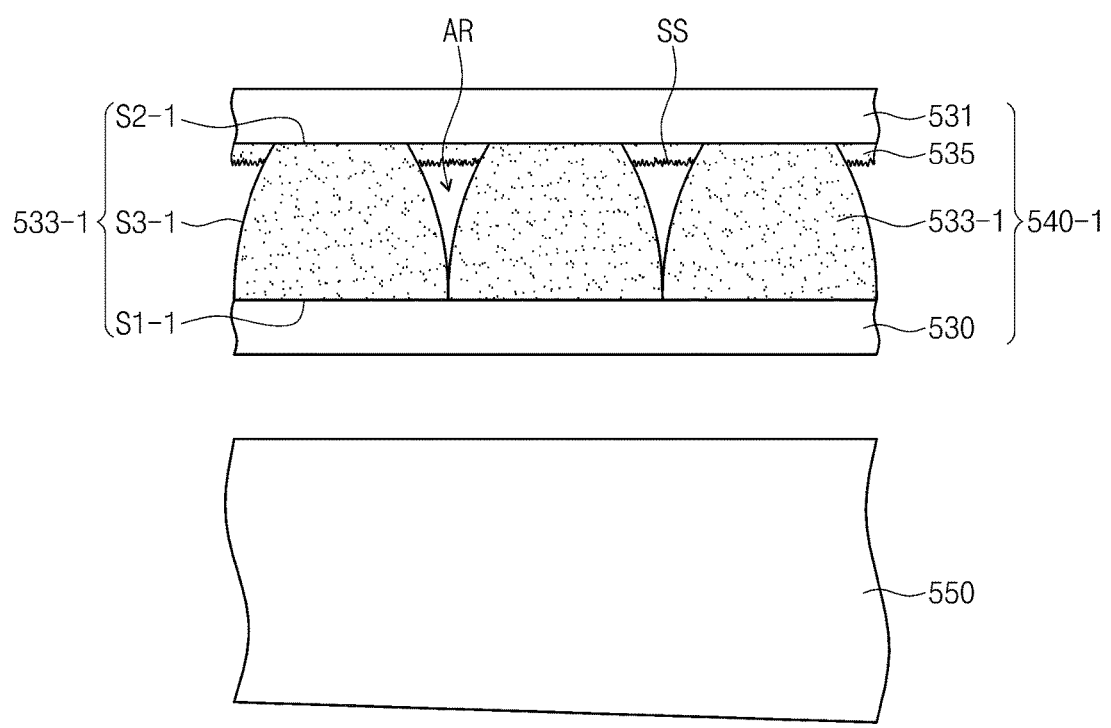
FIG. 4B is a cross-sectional view of a portion of the display device taken along line III-III' of FIG. 4A.

FIG. 4A is a plan view illustrating a portion of another exemplary embodiment of an optical member in the display device illustrated in FIG. 2 according to the invention, and FIG. 4B is a cross-sectional view of a portion of the display device taken along line III-III' of FIG. 4A. In describing FIGS. 4A and 4B, previously described components will be designated by the same reference numerals, and overlapping descriptions thereof will not be provided.

Referring to FIGS. 4A and 4B, an optical member 540-1 includes a first base film 530, a second base film 531, multiple first optical patterns 533-1 and multiple second optical patterns 535. The first and second optical patterns 533-1 and 535 may otherwise be referred to as first and second optical patterns.

The multiple optical patterns 533-1 respectively have a lower surface S1-1, an upper surface S2-1, and a side surface S3-1 connecting the lower surface S1-1 to the upper surface S2-1. The side surface S3-1 may be inclined with respect to each of the upper surface S2-1 and the lower surface S1-1.

In the illustrated exemplary embodiment, the multiple optical patterns 533-1 may respectively have a tapered shape in a cross-section, and the side surface S3-1 may have a round (e.g., curved) shape.

In the exemplary embodiment illustrated in FIGS. 3A and 3B, the multiple optical patterns (533 in FIGS. 3A and 3B) respectively have a line shape for which lengths thereof continuously extend along the first direction D1. However in the exemplary embodiment illustrated in FIGS. 4A and 4B, the multiple optical patterns 533-1 may respectively have a dot shape disposed in a discrete (e.g., non-continuous extension) in the plan view. The first and second optical patterns 533-1 and 535 alternate in both the first and second directions D1 and D2.

In the illustrated exemplary embodiment, a planar size of the upper surface S2-1 may be smaller than that of the lower surface S1-1. In the plan view, the lower surface S1-1 may be located inside the upper surface S2-1.

Figure 5:
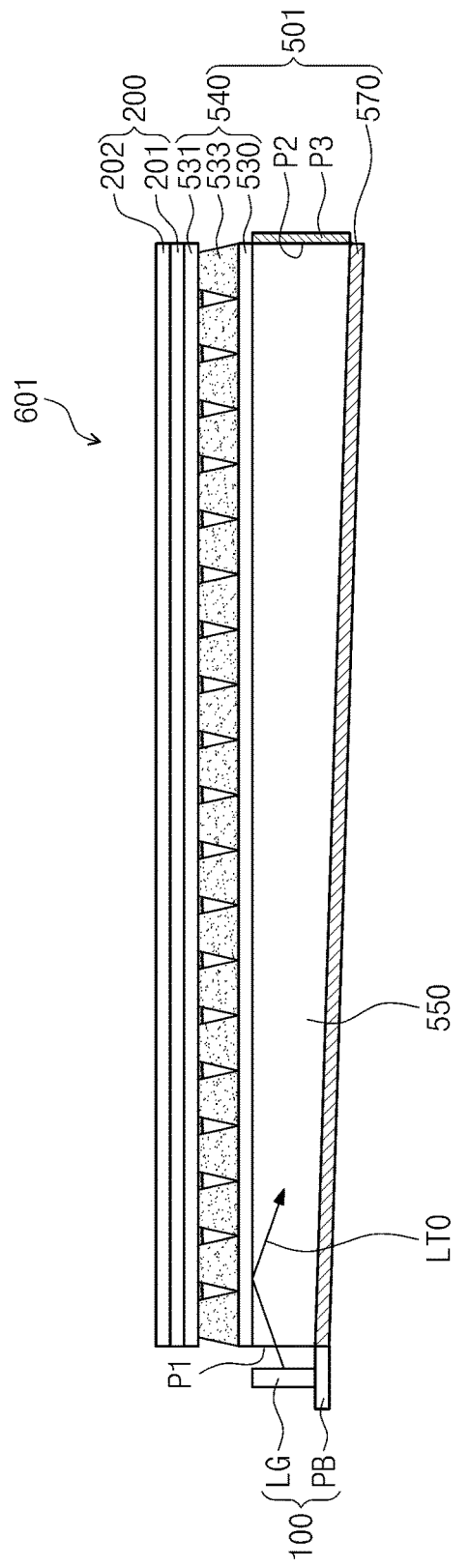
FIG. 5 is a cross-sectional view illustrating another exemplary embodiment of a display device according to the invention.

FIG. 5 is a cross-sectional view illustrating another exemplary embodiment of a display device according to the invention. In describing FIG. 5, previously described components will be designated by the same reference numerals, and overlapping descriptions thereof will not be provided. While FIG. 5 is illustrated with the optical member 540 of FIGS. 3A and 3B, the invention is not limited thereto. Alternatively, the optical member 540-1 of FIGS. 4A and 4B may be included in the display device of FIG. 5.

Referring to FIG. 5, a display device 601 includes a backlight assembly 501, and the backlight assembly 501 includes an optical member 540, a light guide plate 550 and a reflecting member 570.

In the illustrated exemplary embodiment, the optical member 540 may be attached to the light guide plate 550. More specifically, a first adhesive member (not shown) may be interposed between a first base film 530 of the optical member 540 and the light guide plate 550, and the first base film 530 may be attached to the light guide plate 550 by the first adhesive member. The first adhesive member may have a non-optical property like an optical clear adhesive ("OCA").

In the illustrated exemplary embodiment, the reflecting member 570 may be attached to a bottom surface of the light guide plate 550. A second adhesive member may be interposed between the reflecting member 570 and the light guide plate 550, and the reflecting member 570 may be attached to the light guide plate 550 by the second adhesive member. The second adhesive member may include a same material as the first adhesive member such as having a non-optical property like an OCA, but the invention is not limited thereto.

Figure 6:
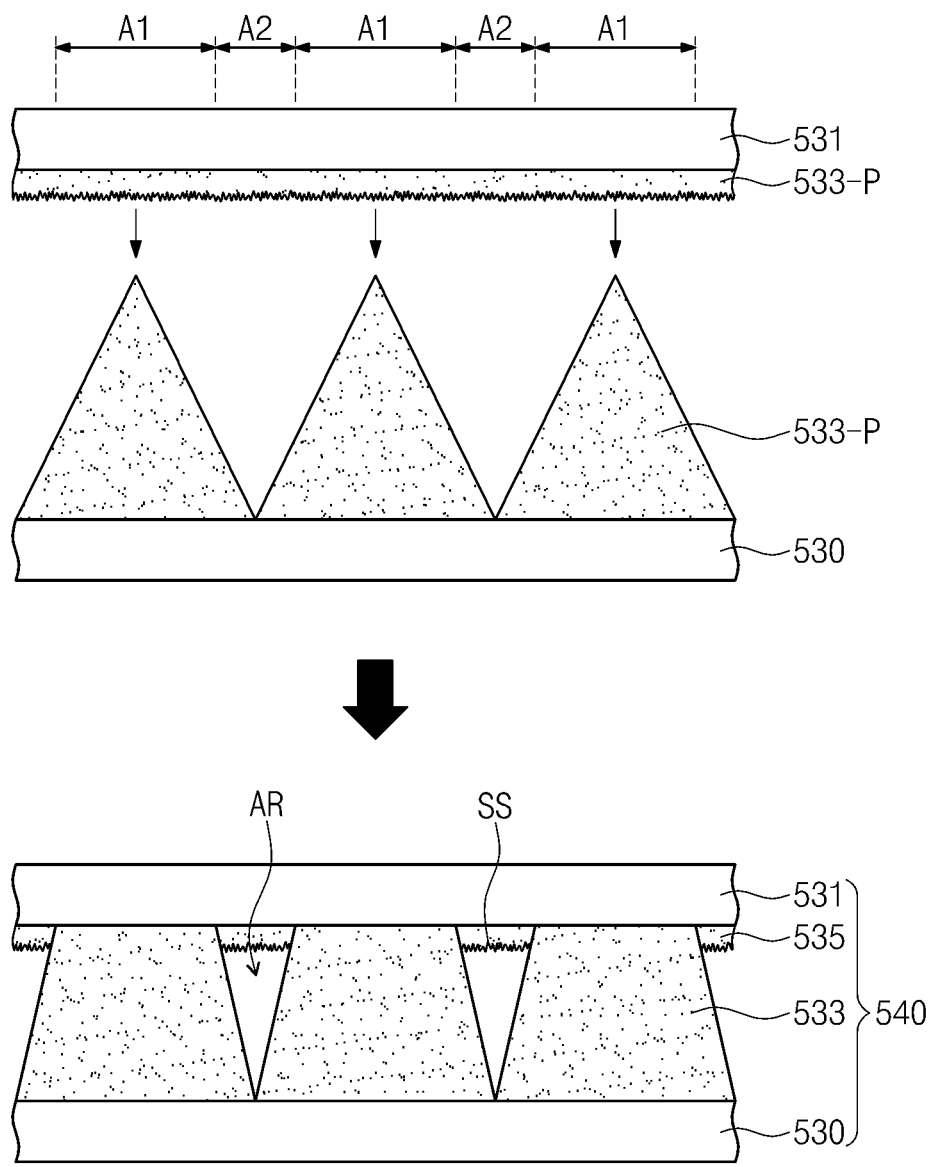
FIG. 6 is a view illustrating an exemplary embodiment of a method for manufacturing a display device.

FIG. 6 is a view illustrating an exemplary embodiment of a method for manufacturing a display device. The method disclosed in FIG. 6 is described related to the exemplary embodiment in FIGS. 3A and 3B, but the invention is not limited thereto. The method disclosed in FIG. 6 may be similarly applied in forming the exemplary embodiment in FIGS. 4A and 4B. In describing FIG. 6, previously described components will be designated by the same reference numerals, and overlapping descriptions thereof will not be provided.

Referring to the upper view of FIG. 6, first preliminary optical patterns 533-P are formed on a first base film 530 such as being protruded from a surface of the first base film 530, and second preliminary optical patterns 535-P are formed on a second base film 531 such as being protruded from a surface of the second base film 531.

In the illustrated exemplary embodiment, the first and second preliminary optical patterns 533-P and 535-P may be formed of an identical material to each other. More specifically, a layer including an oligomer, monomer and photoinitiator is formed on the first and second base films 530 and/or 531 or the second base film 531, and then a gravure process is performed on the formed layer, so that shapes of the first and second preliminary optical patterns 533-P and 535-P are defined. Then, a light irradiation process is performed on the first and second preliminary optical patterns 533-P and 535-P in an un-cured state so that the un-cured first and second preliminary optical patterns 533-P and 535-P may be cured to form a cured state of the first and second preliminary optical patterns 533-P and 535-P.

Subsequently, the first base film 530 on which the first preliminary optical patterns 533-P are formed, is pressed (downward vertical arrows in the upper view of FIG. 6) onto the second base film 531 on which the second preliminary optical patterns 535-P are formed.

Thus, referring to the lower view of FIG. 6, first optical patterns 533 are formed from a deformed state of the first preliminary optical patterns 533-P, corresponding to a first area A1, by pressing of the first and second preliminary optical patterns 533-P and 535-P onto each other. Again referring to the lower view of FIG. 6, the second optical patterns 535 are formed from a deformed state of the second preliminary optical patterns 535-P by pressing of the first and second preliminary optical patterns 533-P and 535-P onto each other. The second preliminary optical patterns 535-P are maintained corresponding to a second area A2. The first and second optical patterns 533 and 535 are considered respective patterns of the first and second preliminary optical patterns 533-P and 535-P.

According to one or more exemplary embodiment of the invention, the optical member adjusts a path of incident light thereto to supply the adjusted-path light to the display panel, such that the brightness in a front surface direction of the display panel can be enhanced. Also, a deterioration in contrast in the front surface direction of the display panel can be reduced or effectively prevented by the optical member, such that the display quality of display apparatuses including the display panel and backlight of the display device can be enhanced.

It will be apparent to those skilled in the art that various modifications and variations can be made in the invention. Thus, it is intended that the invention covers the modifications and variations of this invention provided they come within the scope of the appended claims and their equivalents.

Hence, a scope of the invention is defined by the technical scope of the accompanying claims.

The above-disclosed subject matter is to be considered illustrative and not restrictive, and the appended claims are intended to cover all such modifications, enhancements and other embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:
1. A display device comprising:
a backlight assembly which generates light; and
a display panel which displays an image with the light generated by the backlight assembly,
wherein the backlight assembly comprises:
a light emitting unit which generates the light, and
an optical member to which the light generated by the light emitting unit is incident, wherein the optical member adjusts a path of the light incident thereto, the light for which the path thereof is adjusted is output from the optical member toward the display panel,
wherein the optical member comprises
a first base film to which the light generated by the light emitting unit is incident;
a second base film for which are defined a first area and a second area alternately disposed, the second base film facing the first base film to be disposed closer to the display panel than the first base film;
a first optical pattern between the first and second base films at the first area of the second base film, wherein the first optical pattern refracts therein the light incident to the first base film; and
a second optical pattern between the first and second base films at the second area of the second base film, wherein the second optical pattern scatters the light incident to the first base film.

2. The display device of claim 1, wherein the first optical pattern between the first and second base films at the first area of the second base film comprises:
a lower surface contacting the first base film, and
an upper surface contacting the second base film,
wherein a size of the lower surface is greater than that of the upper surface.

3. The display device of claim 2, wherein in a plan view, the upper surface is disposed inside the lower surface.

4. The display device of claim 2, wherein
a space is defined between adjacent first optical patterns, and
the second optical pattern and a material which is separate from the second optical pattern are each disposed in the space defined between the adjacent first optical patterns.

5. The display device of claim 4, wherein
the second optical pattern in the space defined between the adjacent first optical patterns contacts the material disposed in the space defined between the adjacent first optical patterns, and
a surface of the second optical pattern contacting the material disposed in the space defined between the adjacent first optical patterns has a concavo-convex shape.

6. The display device of claim 4, wherein
the first optical pattern between the first and second base films at the first area of the second base film further comprises a side surface connecting the lower surface to the upper surface, and
the side surface connecting the lower surface to the upper surface is inclined with respect to each of the lower and upper surfaces.

7. The display device of claim 4, wherein in a cross-section, the first optical pattern between the first and second base films at the first area of the second base film has a tapered shape.

8. The display device of claim 4, wherein
the first optical pattern between the first and second base films at the first area of the second base film further comprises a side surface connecting the lower surface to the upper surface, and
the side surface connecting the lower surface to the upper surface has a curved shape.

9. The display device of claim 8, wherein in a plan view, the first optical pattern has a discrete dot shape.

10. The display device of claim 9, wherein in the plan view,
the first optical pattern having the discrete dot shape is provided in plural, and
the plurality of the first optical patterns having the discrete dot shape is arranged in a first direction and a second direction which crosses the first direction.

11. The display device of claim 4, wherein
the backlight assembly further comprises a light guide plate facing the display panel with the optical member interposed therebetween, and
the light emitting unit comprises a plurality of light emitting diode packages arranged in a first direction along a side portion of the light guide plate facing the display panel with the optical member interposed therebetween.

12. The display device of claim 11, wherein in a plan view, the first optical pattern has a line shape extended in the first direction.

13. The display device of claim 12, wherein in the plan view,
the first optical pattern having the line shape is provided in plural, and
the plurality of the first optical patterns having the line shape is arranged in a second direction crossing the first direction.

14. The display device of claim 11, wherein the optical member is adhered to the light guide plate.

15. The display device of claim 4, wherein of the second optical pattern in the space defined between the adjacent first optical patterns has a greater refractive index than that of the material disposed in the space defined between the adjacent first optical patterns.

16. The display device of claim 4, wherein refractive indices of the first optical pattern, the second optical pattern and the second base film are the same.

* * * * *